US009001064B2

(12) United States Patent
Mesguich Havilio (10) Patent No.: US 9,001,064 B2
(45) Date of Patent: Apr. 7, 2015

(54) TOUCH SENSITIVE DEVICE WITH PINCH-BASED ARCHIVE AND RESTORE FUNCTIONALITY

(71) Applicant: barnesandnoble.com llc, New York, NY (US)

(72) Inventor: Amir Mesguich Havilio, Palo Alto, CA (US)

(73) Assignee: barnesandnoble.com llc, New York, NY (US)

( * ) Notice: Subject to any disclaimer, the term of this patent is extended or adjusted under 35 U.S.C. 154(b) by 116 days.

(21) Appl. No.: 13/715,279

(22) Filed: Dec. 14, 2012

(65) Prior Publication Data

US 2014/0168095 A1 Jun. 19, 2014

(51) Int. Cl.
*G06F 3/041* (2006.01)
*G06F 3/0488* (2013.01)

(52) U.S. Cl.
CPC .. *G06F 3/04883* (2013.01); *G06F 2203/04808* (2013.01)

(58) Field of Classification Search
CPC ............... G06F 3/041–3/047; G06F 3/048; G06F 3/0484–3/04847; G06F 3/0488; G06F 2203/04808
USPC ......... 345/173–178; 178/18.01–18.09, 18.11; 715/764, 775, 863
See application file for complete search history.

(56) References Cited

U.S. PATENT DOCUMENTS

| | | | |
|---|---|---|---|
| 4,896,543 A | 1/1990 | Gullman | |
| 5,633,471 A | 5/1997 | Fukushima | |
| 5,844,557 A | 12/1998 | Shively, II | |
| 6,259,438 B1 | 7/2001 | Fleck et al. | |
| 6,956,564 B1 | 10/2005 | Williams | |
| 7,649,524 B2 | 1/2010 | Haim et al. | |
| 7,840,912 B2 | 11/2010 | Elias et al. | |
| 7,898,541 B2 | 3/2011 | Hong et al. | |
| RE42,738 E | 9/2011 | Williams | |
| 8,059,101 B2 | 11/2011 | Westerman et al. | |

(Continued)

FOREIGN PATENT DOCUMENTS

EP 0722150 A1 7/1996

OTHER PUBLICATIONS

"Adonit Jot Touch (for iPad)," Adonit Jot Touch (for iPad) Review & Rating—PCMag.com; http://www.pcmag.com/article2/0,2817,2411192,00.asp; 6pages, printed from the Internet on Jun. 20, 2013.

(Continued)

*Primary Examiner* — Stephen Sherman
(74) *Attorney, Agent, or Firm* — Finch & Maloney PLLC (57) ABSTRACT

Techniques are disclosed for archiving and restoring content in electronic touch sensitive devices. The archive/restore function can be used to move, delete, or restore content that may be displayed on a screen. The user can engage the function with a particular pinch-based gesture. In some cases, the archive function includes closing a document or application, saving a file to a selected location, reversibly deleting a file, permanently deleting a file, or deleting a user-selected portion of content. In some cases, the restore function includes recovering a file from the trash bin by saving it to a previous save location, or returning content view to a previous state. In some cases, the archive function includes deleting a user-selected portion of a document, deleting a file, saving a file to a selected location, or saving one or more items to a previous save location.

20 Claims, 10 Drawing Sheets

(56) References Cited

U.S. PATENT DOCUMENTS

| | | | |
|---|---|---|---|
| 8,239,413 | B2 | 8/2012 | Hubert |
| 8,274,536 | B2 | 9/2012 | Chaudhri et al. |
| 8,286,104 | B1 | 10/2012 | Yonge-Mallo |
| D670,713 | S | 11/2012 | Cranfill et al. |
| RE44,103 | E | 3/2013 | Williams |
| 8,400,417 | B2 | 3/2013 | Ording et al. |
| 8,508,494 | B2 | 8/2013 | Moore |
| 2001/0025289 | A1 | 9/2001 | Jenkins et al. |
| 2002/0116421 | A1 | 8/2002 | Fox et al. |
| 2007/0047002 | A1 | 3/2007 | Hull et al. |
| 2008/0005703 | A1* | 1/2008 | Radivojevic et al. ......... 715/863 |
| 2008/0036747 | A1 | 2/2008 | Hope |
| 2010/0100854 | A1 | 4/2010 | Russell et al. |
| 2010/0192086 | A1 | 7/2010 | Kocienda et al. |
| 2010/0229130 | A1 | 9/2010 | Edge et al. |
| 2010/0259482 | A1 | 10/2010 | Ball |
| 2010/0262659 | A1 | 10/2010 | Christiansen et al. |
| 2010/0318895 | A1 | 12/2010 | Steinberger et al. |
| 2011/0148786 | A1* | 6/2011 | Day et al. ...................... 345/173 |
| 2011/0193788 | A1* | 8/2011 | King et al. .................... 345/173 |
| 2011/0258542 | A1 | 10/2011 | Kenney et al. |
| 2012/0026100 | A1* | 2/2012 | Migos et al. .................. 345/173 |
| 2012/0056821 | A1 | 3/2012 | Goh |
| 2012/0127110 | A1 | 5/2012 | Amm et al. |
| 2012/0139879 | A1 | 6/2012 | Kim et al. |
| 2012/0221938 | A1 | 8/2012 | Patterson et al. |
| 2012/0235901 | A1 | 9/2012 | Binder |
| 2012/0242579 | A1 | 9/2012 | Chua |
| 2012/0242584 | A1 | 9/2012 | Tuli |
| 2012/0249768 | A1 | 10/2012 | Binder |
| 2012/0280947 | A1 | 11/2012 | Weaver et al. |
| 2012/0311438 | A1 | 12/2012 | Cranfill et al. |
| 2012/0329529 | A1 | 12/2012 | van der Raadt |
| 2013/0016045 | A1 | 1/2013 | Zhao et al. |
| 2013/0036383 | A1 | 2/2013 | Yuan et al. |
| 2013/0063364 | A1 | 3/2013 | Moore |
| 2013/0076632 | A1 | 3/2013 | Sirpal et al. |
| 2013/0076637 | A1 | 3/2013 | Teltz |
| 2013/0076638 | A1 | 3/2013 | Sirpal et al. |
| 2013/0076781 | A1 | 3/2013 | Sirpal et al. |
| 2013/0113699 | A1 | 5/2013 | Lim |
| 2013/0120271 | A1 | 5/2013 | Lee et al. |
| 2013/0135234 | A1 | 5/2013 | Hisano et al. |
| 2013/0139078 | A1 | 5/2013 | Chuang et al. |
| 2013/0139107 | A1 | 5/2013 | Jung |
| 2013/0162532 | A1 | 6/2013 | Cheng et al. |
| 2013/0185680 | A1 | 7/2013 | Chaudhri et al. |
| 2013/0194308 | A1 | 8/2013 | Privault et al. |
| 2013/0314341 | A1* | 11/2013 | Lee et al. ...................... 345/173 |

OTHER PUBLICATIONS

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.

"Bamboo Stylus," Wacom Americas, http://www.wacom.com/en/products/stylus, 5 pages, printed from the Internet on Jun. 20, 2013.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.

Malacria, et al., "Clutch-Free Panning and Integrated Pan-Zoom Control on Touch-Sensitive Surfaces: The.CycloStar Approach," CHI 2010, Apr. 10-15, 2010, Atlanta, Georgia, USA. Copyright 2010 ACM 978-1-60558-929-9, 10 pages, Sep. 10, 2004.

"Pen," DuoSense Pen, N-trig Hands-on computing, http://www.n-trig.com/Content.aspx?Page=DigitalPencil, 3 page, printed from the Internet on Jun. 20, 2013.

"Easing functions," Easing Functions Cheat Sheet, http://easings.net/, 3 pages, printed from the Internet on Jun. 17, 2013.

Kirupa, Easing Functions (aka Timing Functions) in CSS3, printed Apr. 3, 2013, Kirupa.Com, http://www.kirupa.com/html5/easing_functions_css3.htm, 16 pages, printed from the Internet on Jun. 18, 2013.

"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, 5 pages, printed from the Internet on Aug. 2, 2013.

"Simultaneous Pen & Touch: The Natural Way to Work," Perceptive Pixel Active Stylus, www.perceptivepixel.com/_literature_136086/Active_Stylus, 2 pages, printed from the Internet on Dec. 14, 2012.

"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.

"Guidelines for selecting text and images (Windows Store apps)," http://msdn.microsoft.com/en-us/library/windows/apps/hh465334, 5 pages, printed from the Internet on Jun. 20, 2013.

Lutz, Zachary, "Hands-on with wireless, ultrasonic stylus an touchless gestures at MWC (video)," posted Mar. 1st, 2012 at 8:28 AM, http://www.engadget.com/2012/03/01/hands-on-with-wireless-ultrasonic-stylus-and-touchl, 3 pages, printed from the Internet on Jun. 20, 2013.

"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.

"How do WACOM tablets work?," tablet4u.co.uk, http://www.tablet4u.co.uk/techinfo.html, 2 pages, printed from the Internet on Jun. 20, 2013.

Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown-6 pages, printed from the Internet on Nov. 3, 2012.

"Desktop Touchscreens," —Desktop touchscreens explained, http://www.touchscreenmagazine.nl/touchscreen-solutions/desktop-touchscreens, 1 page, printed from the Internet on Nov. 3, 2012.

"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.

"Padblue 2," Brando—mobile.brando.com, http://mobile.brando.com/Padblue-2_p9162c1577d94.html., 4 pages, printed from the Internet on May 10, 2013.

Fingas, Jon, "Panasonic mobile devices to use Anoto's pattern-based pen input technology," posted Jan. 8th, 2013 at 1:00PM, http://www.engadget.com/2013/01/08/panasonic-mobile-devices-to-use-anoto-pattern-pen-, 4 pages, printed from the Internet on Jun. 20, 2013.

"Bluetooth 4.0 SmartPen The future just got a little brighter," Pogo Connect, http://tenonedesign.com/connect.php, 7 pages, printed from the Internet on Jun. 20, 2013.

Quick, Darren, "Pressure sensitive technology set to bring 3D capability to touchscreens," posted on Jan. 31, 2010, Mobile Technology, http://www.gizmag.com/new-touchscreen-technology, 4 pages, printed from the Internet on Aug. 2, 2013.

Rigg, Jamie, "Sony tries to patent stylus with friction-based haptic feedback," posted on Nov 22nd, 2012 at 9:50 AM, http://www.engadget.com/2012/11/22/sony-haptic-feedback-stylus-patent/, 2 pages, printed from the Internet on Jun. 20, 2013.

"Stylus Hanging Bluetooth Headset," Brando—mobile.brando.com, http://mobile.brando.com/prod_detail.php? prod_id=03291, 4 pages, printed from the Internet on May 10, 2013.

(56) References Cited

OTHER PUBLICATIONS

"The JukeStyle is a great budget stylus for your iOS devices," stylus Archives—iPad News, http://www.ipadnews.nl/tag/ stylus/, 44 pages, printed from the Internet on Jun. 20, 2013.

Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flipping-through-paper-like-pages-endures-in-the-digital-world/, 5 pages, printed from the Internet on May 6, 2013.

Bragdon, et al., "Experimental Analysis of Touch-Screen Gesture Designs in Mobile Environments", Proceedings of the SIGCHI Conference on Human Factors in Computing Systems, pp. 403-412 (2011).

"Gesture Search for Google Mobile", Google Mobile, www.google.com/mobile/gesture-search, 1 page, printed from the Internet on Dec. 26, 2012.

"Comics by comiXology," Comic Book Reader Guide, http://www.comicbookreaderguide.com/comics-by-comixology/, 24 pages, printed from the Internet on May 6, 2013.

"NFC Forum: Frequently Asked Questions," http://www.nfc-forum.org/resources/faqs#acknowledge, 11 pages, printed from the Internet on Feb. 2, 2013.

"How to Remote Wipe an iPhone or iPad," OSXDaily, http://osxdaily.com/2012106/05/remote-wipe-iphone-or-ipad/, 4 pages, printed from the Internet on Feb. 2, 2013.

"Screen hotspot," Wikipedia, the free encyclopedia, http://en.wikipedia.org/wiki/Screen_hotspot, 1 page, printed from the Internet on May 15, 2013.

"PAiA-Touch Switches," PAiA Corporation USA, file:///S:/Client%20Files/Barnes%20&%20Noble/IDS°/020Master%20Folder/S&G%20-%2 . . ., 3 pages, printed from the Internet on Aug. 27, 2013.

Kanai, et al., "Intra-Rendition Navigation," Copyright 2012-2013 International Digital Publishing Forum (IDPF), 13 pages.

"explaining how the sPen tech works (and is very diff than other styluses)," http://forum.xda-developers.com/showthread.php?t=, 1 page, printed from the Internet on Jan. 15, 2013.

\* cited by examiner

TOUCH SENSITIVE DEVICE WITH PINCH-BASED ARCHIVE AND RESTORE FUNCTIONALITY

FIELD OF THE DISCLOSURE

This disclosure relates to electronic display devices, and more particularly, to user interface techniques for interacting with touch sensitive devices.

BACKGROUND

Electronic display devices such as tablets, eReaders, mobile phones, smart phones, personal digital assistants (PDAs), and other such touch screen electronic display devices are commonly used for displaying consumable content. The content may be, for example, an e-book, an online article or blog, images, a movie or video, a map, just to name a few types. Such display devices are also useful for displaying a user interface that allows a user to interact with an application running on the device. The user interface may include, for example, one or more touch screen controls and/or one or more displayed labels that correspond to nearby hardware buttons. The touch screen display may be backlit or not, and may be implemented for instance with an LED screen or an electrophoretic display. Such devices may also include other touch sensitive surfaces, such as a track pad (e.g., capacitive or resistive touch sensor) or touch sensitive housing (e.g., acoustic sensor).

DETAILED DESCRIPTION

Techniques are disclosed for pinch-based archiving and restoring data in electronic touch sensitive devices, such as touch screen and track pad devices. The archive/restore function may be associated with an inward or outward multi-touch (or multipoint) pinch gesture on the touch sensitive device. In some example embodiments, the gesture is an inward or contracting pinch that may be performed by bringing multiple fingers together on the touch sensitive surface, as if the user were crumpling an actual piece of paper. The same action may be reversed so as to provide an outward or expanding pinch gesture by separating multiple fingers on the touch sensitive surface. Such a pinch-based gesture may be used, for example, to move or delete a current document, to delete selected content from a current document, to close a current application or browser tab, or to restore a document from a trash folder. For instance, in some specific cases, the archive/restore feature may be configured to, in response to an inward pinch-based gesture, automatically send an item or items to the trash bin or to permanently delete those item(s), while in other example cases an item or items may be automatically sent to a specific folder. In still other cases, the user can grab a document or item with the multipoint pinch gesture and drag it to a desired location (e.g., the trash bin or a folder). The user may also view the contents of the trash bin and restore one or more items to their original location by performing the outward pinch gesture, for instance. If the user is engaged in an application or viewing a website, the archive feature may be configured to, in response to an inward pinch-based gesture, save all current progress and close the application or web page. In some example cases, the pinch gesture may be combined with an initial tap gesture that can identify a particular item or items on the screen that is/are targeted for archival/restoration. The number of touch points making up the gesture may be user-configurable.

General Overview

As previously explained, electronic display devices such as tablets, eReaders, and smart phones are commonly used for displaying user interfaces and consumable content. In some instances, the user might desire to archive, or restore content on the electronic device. For instance, the user might wish to organize certain files by sending them to a particular folder or deleting them; or the user might wish to restore a deleted item to its previous saved location on the device. While some electronic devices provide "close" buttons or a series of actions for saving/deleting/undeleting documents, there does not appear to be an intuitive user interface archive/restore function.

Thus, and in accordance with an embodiment of the present invention, techniques are provided for archiving and restoring data in electronic touch sensitive devices. The archive function can be used to store or delete a file, or to delete selected content, or to save and close an application or a web page, for instance. As will be appreciated in light of this disclosure, archive as used herein encompasses all delete actions. A delete action may be, for example, a reversible delete (e.g., such as the example case where content or a portion of content is sent to trash can, but is still restorable) or a permanent delete. The restore function can be used, for example, to restore a document from the trash folder to its previous location, or to go back a previous content view. The user can archive or restore content with a particular gesture that is associated with the archive/restore feature, such as an inward or outward pinch gesture with two or more fingers. In a more general sense, any uniquely identifiable contacts on a touch sensitive surface by the user can be used to engage the pinch-based archive/restore function. The uniqueness of the touch may be based, for example, on the particular location of the touch and/or the nature of the touch (e.g., expanding four contact points, tapping one point and then collapsing four contact points, etc). Once engaged, the archive/restore feature assists the user in organizing or navigating the given content. In some cases, the archive/restore feature allows the user to grab a document and drag it to a desired location. In other cases, the document may automatically be deleted or sent to an archive folder when the pinch gesture is performed.

In some embodiments, the archive/restore feature may be combined with an initial tap(s), which can select one or more items that are to be archived. In one such embodiment, the user may tap one or more files or folders, for instance, and then perform an inward pinch gesture, which may delete the files or folders initially selected. In another such embodiment, the user may access the trash folder, select an item or items within the folder with initial corresponding tap gesture on each target item, and perform an outward pinch with two or more fingers which may restore the item or items to their previously saved locations. In some embodiments, the techniques described herein may be implemented to open, archive, close, or otherwise organize content within Internet browsers or file browsers. In other embodiments, the techniques described herein may be combined with text or item selection techniques. In one such example case, the user may select a section of text within a document and delete that text with an inward pinch gesture.

Numerous uniquely identifiable engagement schemes that exploit a touch sensitive surface can be used as will be appreciated in light of this disclosure. Further note that any touch sensitive device (e.g., track pad, touch screen, or other touch sensitive surface, whether capacitive, resistive, acoustic or other touch detecting technology) may be used to detect the user contact and the claimed invention is not intended to be limited to any particular type of touch sensitive technology, unless expressly stated.

Architecture

Figure 1A:
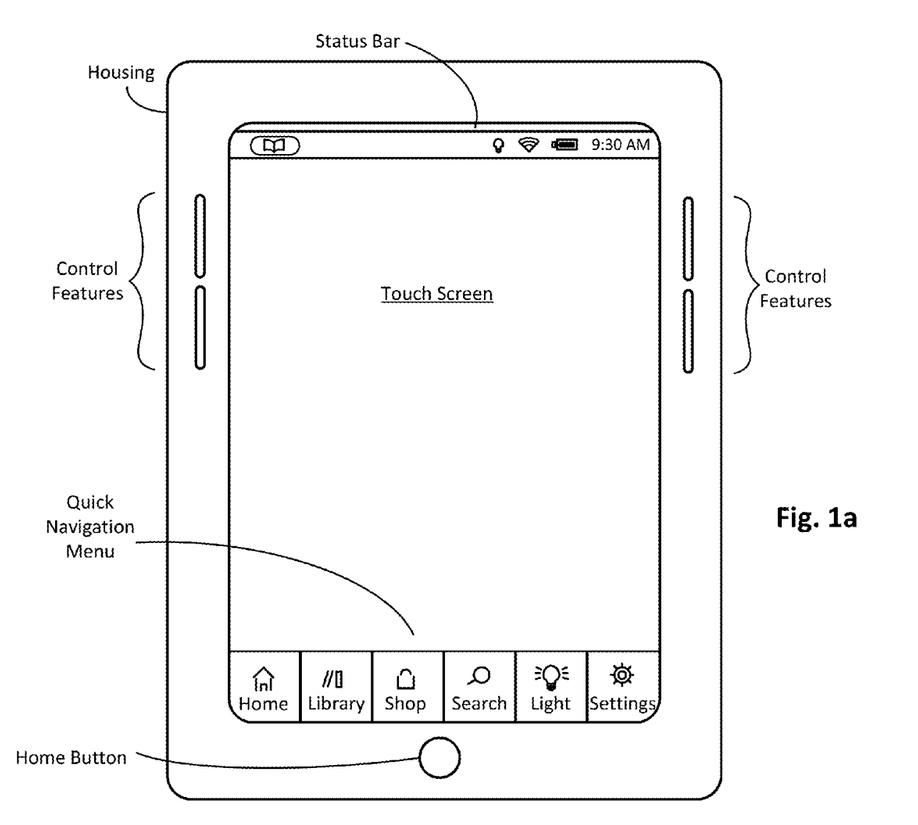
FIGS. 1a-b illustrate an example electronic touch sensitive device having a pinch-based archive/restore function, configured in accordance with an embodiment of the present invention.
Figure 1B:
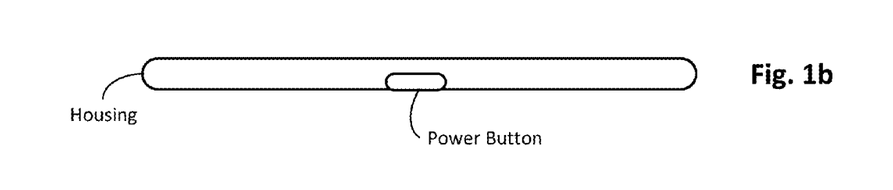

FIGS. 1a-b illustrate an example electronic touch sensitive device with an archive and restore function configured in accordance with an embodiment of the present invention. The device could be, for example, a tablet such as the NOOK® Tablet by Barnes & Noble. In a more general sense, the device may be any electronic device having a touch sensitive user interface and capability for displaying content to a user, such as a mobile phone or mobile computing device such as an eReader or laptop, a desktop computing system, a television, a smart display screen, or any other device having a touch screen display or a non-touch display screen that can be used in conjunction with a touch sensitive surface. As will be appreciated, the claimed invention is not intended to be limited to any particular kind or type of electronic device.

As can be seen with this example configuration, the device comprises a housing that includes a number of hardware features such as a power button, control features, and a press-button (sometimes called a home button herein). A touch screen based user interface is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such user interface (UI) touch screen features, or different UI touch screen features altogether, depending on the target application of the device. Any such general UI controls and features can be implemented using any suitable conventional or custom technology, as will be appreciated.

The hardware control features provided on the device housing in this example embodiment are configured as elongated press-bars and can be used, for example, to page forward (using the top press-bar) or to page backward (using the bottom press-bar), such as might be useful in an eReader application. The power button can be used to turn the device on and off, and may be used in conjunction with a touch-based UI control feature that allows the user to confirm a given power transition action request (e.g., such as a slide bar or tap point graphic to turn power off). Numerous variations will be apparent, and the claimed invention is not intended to be limited to any particular set of hardware buttons or features, or device form factor.

In this example configuration, the home button is a physical press-button that can be used as follows: when the device is awake and in use, tapping the button will display the quick navigation menu, which is a toolbar that provides quick access to various features of the device. The home button may also be configured to cease an active function that is currently executing on the device, or close a configuration sub-menu that is currently open. The button may further control other functionality if, for example, the user presses and holds the home button. For instance, an example such push-and-hold function could engage a power conservation routine where the device is put to sleep or an otherwise lower power consumption mode. So, a user could grab the device by the button, press and keep holding as the device was stowed into a bag or purse. Thus, one physical gesture may safely put the device to sleep. In such an example embodiment, the home button may be associated with and control different and unrelated actions: 1) show the quick navigation menu; 2) exit a configuration sub-menu; and 3) put the device to sleep. As can be further seen, the status bar may also include a book icon (upper left corner). In some cases, tapping the book icon may provide bibliographic information on the content or provide the main menu or table of contents for the book, movie, playlist, or other content.

In one example embodiment, the archive and restore function described herein may be performed with an inward or outward pinch gesture on the touch sensitive surface using two or more contact points. In one such embodiment, the pinch gesture may be performed with four fingers (e.g. the thumb, index, middle, and ring fingers). The pinch gesture may be user-configurable with a sub-menu to perform a number of different functions. In one particular embodiment, an archive/restore configuration sub-menu, such as the one shown in FIG. 1d, may be accessed by tapping or otherwise touching the Settings option in the quick navigation menu, which causes the device to display the general sub-menu shown in FIG. 1c. From this general sub-menu, the user can select any one of a number of options, including one designated Screen/UI in this specific example case. Selecting this sub-menu item (with an appropriately placed screen tap) may cause the archive/restore sub-menu of FIG. 1d to be displayed, in accordance with an embodiment. In other example embodiments, selecting the Screen/UI option may present the user with a number of additional sub-options, one of which may include a so-called archive/restore feature option, which may then be selected by the user so as to cause the archive/restore configuration sub-menu of FIG. 1d to be displayed. Any number of such menu schemes and nested hierarchies can be used, as will be appreciated in light of this disclosure.

In other embodiments, the archive and restore function is hard-coded such that no configuration sub-menus are needed or otherwise provided (e.g., 4 or 5 finger pinch gesture for carrying out actions as described herein, with no user configuration).

As will be appreciated, the various UI control features and sub-menus displayed to the user are implemented as UI touch screen controls in this example embodiment. Such UI touch screen controls can be programmed or otherwise configured using any number of conventional or custom technologies. In general, the touch screen translates the user touch in a given location into an electrical signal which is then received and processed by the underlying operating system (OS) and circuitry (processor, etc). Additional example details of the underlying OS and circuitry in accordance with some embodiments will be discussed in turn with reference to FIG. 2a.

Figure 1C:
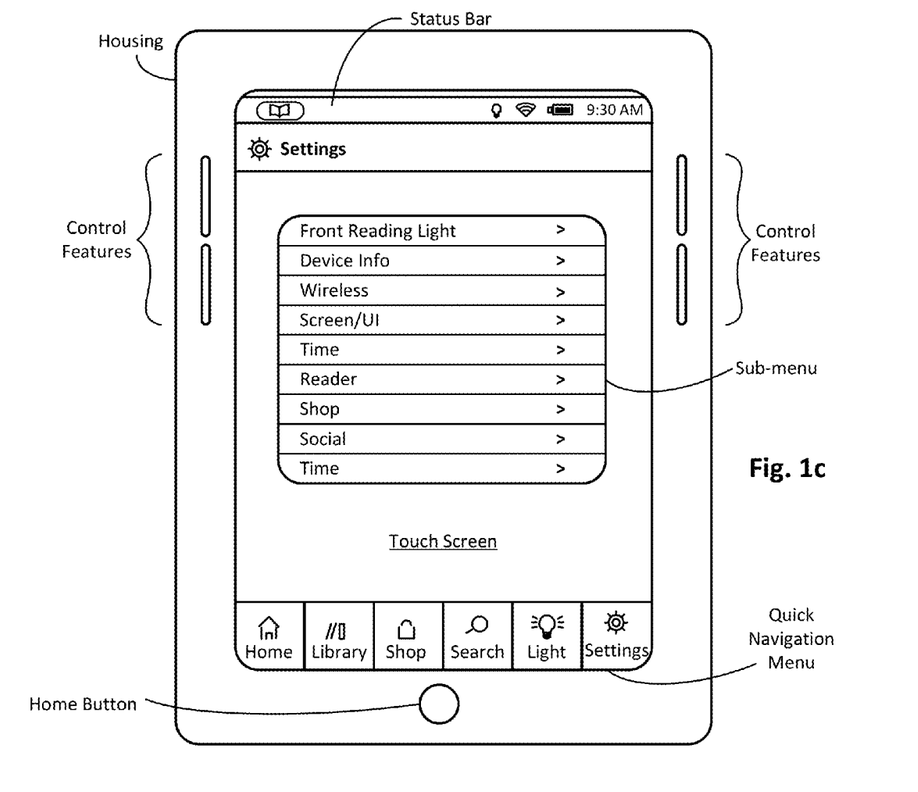
FIGS. 1c-d illustrate example configuration screen shots of the user interface of the electronic touch sensitive device shown in FIGS. 1a-b, configured in accordance with an embodiment of the present invention.
Figure 1D:
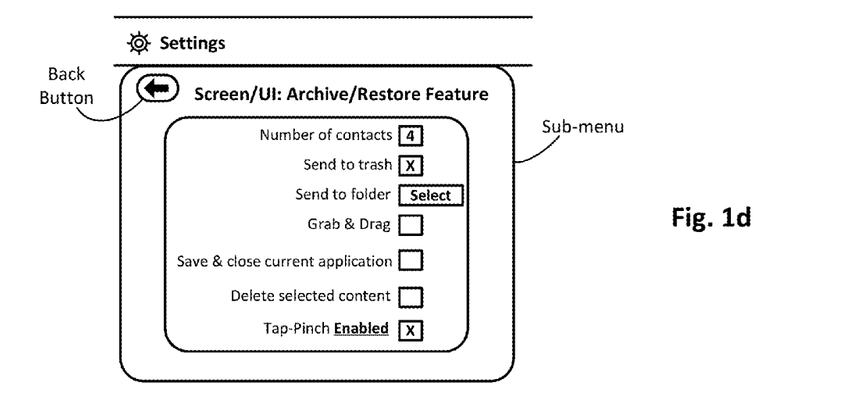

As previously explained, and with further reference to FIGS. 1c and 1d, once the Settings sub-menu is displayed (FIG. 1c), the user can then select the Screen/UI option. In response to such a selection, the archive/restore configuration sub-menu shown in FIG. 1d can be provided to the user. The user can configure a number of functions with respect to the archive/restore mode, in this example embodiment. In more detail, by selecting a number in the 'Number of contacts' option in the sub-menu of FIG. 1d, the user can set how many touch points (or fingers) will be identified as a pinch gesture to activate the archive/restore feature. In the specific example shown, the user has associated the pinch gesture with four contracting or expanding contact points. The user may also select a destination for the archived content. By selecting the 'Send to trash' option, as shown in this particular example, the user may associate the inward pinch gesture with automatically sending contents to the trash bin. In one such example, the user may have a document open on the screen and may automatically delete that document by performing the inward pinch gesture. In another example embodiment, the user may select a desired folder to send all archived contents, by specifying that desired folder using the 'Send to folder' option. In such an example, the user may select one or more items and automatically send them all to a specific folder or location by performing the inward pinch gesture. Note that no dragging gesture to the target location is required. In another example embodiment, the user may select the 'Grab & Drag' option which allows the user to grab a document with the pinch gesture and drag and drop that document in a desired location with a sweeping/drag motion on the touch sensitive surface. In one such example, such a grab and drag feature may allow the user to select a section of text and/or other content within a document and drag it to another location within the document. In another example embodiment, the user may select the 'Save & close current application' option, which associates the inward pinch gesture with saving current progress and closing a currently running application. In another example embodiment, the user may enable the 'Delete selected content' option, which may allow the user to delete a selection of text, a selected span of pages, or any other content that has been selected by the user. In one such example, the user may edit a document by selecting a section of content using a content selection feature, and then deleting that section by performing an inward pinch gesture.

In another example embodiment, the archive/restore configuration sub-menu includes a UI check box that when checked or otherwise selected by the user, enables a 'Tap-Pinch' function (shown in the enabled state); unchecking the box disables the function. In one example, the tap-pinch function allows the user to select one or more items that are to be archived or restored. The item or items may be selected by an initial single contact on the touch sensitive surface. In such an example, the user may initially tap or otherwise contact the touch screen display at a certain location, and within a specific time frame (e.g. 1-2 seconds) may contact the screen at one or more additional points (depending on the number of contacts required for the pinch gesture) to perform the inward or outward pinch gesture. The initial tap may identify which item or items should be archived or restored.

Numerous other configurable aspects will be apparent in light of this disclosure. For instance, in some embodiments, the pinch-gesture can be assigned on an application basis. For instance, the configuration menu may allow the user assign a two-finger pinch gesture to an email application and a three-finger pinch gesture to browser application. Thus, the techniques provided herein can be implemented on a global level or an application level, in some example cases.

In addition, a back button arrow UI control feature is provisioned on the touch screen, so that the user can go back to the Settings menu after the concentration mode has been configured, if so desired. While a number of user-configurable features are provided in some embodiments, other embodiments may have any combination of similar features wherein the features are set as a given default or are otherwise hard-coded, such that no user configuration is necessary.

Figure 2A:
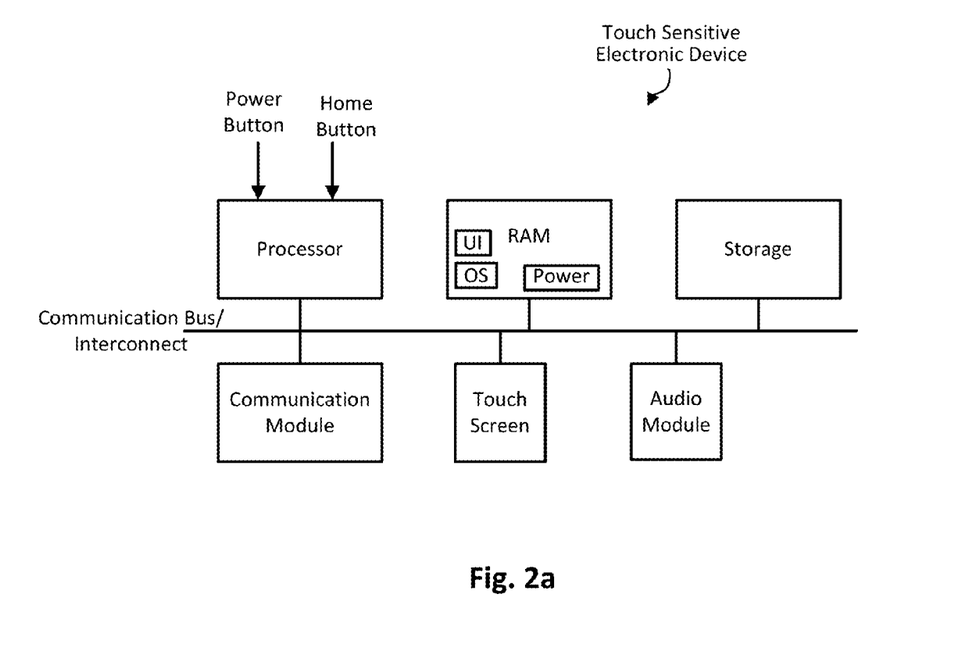
FIG. 2a illustrates a block diagram of an electronic touch sensitive device, configured in accordance with an embodiment of the present invention.

FIG. 2a illustrates a block diagram of an electronic touch screen device configured in accordance with an embodiment of the present invention. As can be seen, this example device includes a processor, random access memory (RAM), additional storage/memory, a communications module, a touch screen, and an audio module. A communications bus and interconnect is also provided to allow inter-device communication. Other typical componentry and functionality not reflected in the block diagram will be apparent (e.g., battery, co-processor, etc). Further note that although a touch screen display is provided, other embodiments may include a non-touch screen and a touch sensitive surface such as a track pad, or a touch sensitive housing configured with one or more acoustic sensors, etc. In any such cases, the touch sensitive surface is generally capable of translating a user's physical contact with the surface into an electronic signal that can be manipulated or otherwise used to trigger a specific user interface action, such as those provided herein. The principles provided herein equally apply to any such touch sensitive devices. For ease of description, examples are provided with touch screen technology.

In this example embodiment, the RAM includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc), and encoded on a machine readable medium, that when executed by the processor (and/or co-processors), carries out the functionality of the device including a UI having an archive/restore function as described herein. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., 800 MHz Texas Instruments OMAP3621 applications processor), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The RAM can be any suitable type of memory and size (e.g., 256 or 512 Mbytes SDRAM), and in other embodiments may be implemented with non-volatile memory or a combination of non-volatile and volatile memory technologies. The storage can also be implemented with any suitable memory and size (e.g., 2 GBytes of flash memory). The display can be implemented, for example, with a 6-inch E-ink Pearl 800×600 pixel screen with Neonode® zForce® touch screen, or any other suitable display and touch screen interface technology. The communications module can be, for instance, any suitable 802.11b/g/n WLAN chip or chip set, which allows for connection to a local network so that content can be downloaded to the device from a remote location (e.g., content provider, etc, depending on the application of the display device). In some specific example embodiments, the device housing that contains all the various componentry measures about 6.5" high by about 5" wide by about 0.5" thick, and weighs about 6.9 ounces. Any number of suitable form factors can be used, depending on the target application (e.g., laptop, desktop, mobile phone, etc). The device may be smaller, for example, for smartphone and tablet applications and larger for smart computer monitor applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The user interface (UI) module can be, for example, based on touch screen technology and the various example screen shots shown in FIGS. 1a-d, 3a-c, 4a-b, 5a-b, 6a-b, and 7a-b in conjunction with the archive/restore methodologies demonstrated in FIG. 8, which will be discussed in turn. The audio module can be configured, for example, to speak or otherwise aurally present a selected eBook table of contents or other textual content, if preferred by the user. Numerous commercially available text-to-speech modules can be used, such as Verbose text-to-speech software by NCH Software. In some example cases, if additional space is desired, for example, to store digital books or other content and media, storage can be expanded via a microSD card or other suitable memory expansion technology (e.g., 32 GBytes, or higher).

Client-Server System

Figure 2B:
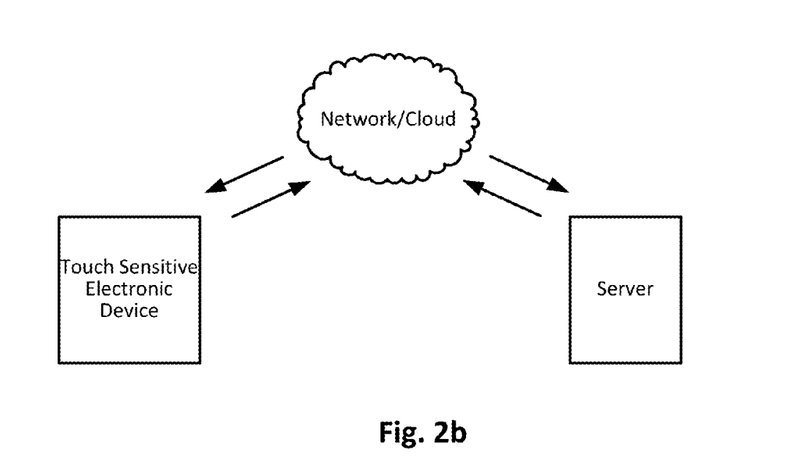
FIG. 2b illustrates a block diagram of a communication system including the electronic touch sensitive device of FIG. 2a, configured in accordance with an embodiment of the present invention.

FIG. 2b illustrates a block diagram of a communication system including the electronic touch sensitive device of FIG. 1a, configured in accordance with an embodiment of the present invention. As can be seen, the system generally includes an electronic touch sensitive device that is capable of communicating with a server via a network/cloud. In this example embodiment, the electronic touch sensitive device may be, for example, an e-Book reader, a mobile cell phone, a laptop, a tablet, desktop, or any other touch sensitive computing device. The network/cloud may be a public and/or private network, such as a private local area network operatively coupled to a wide area network such as the Internet. In this example embodiment, the server may be programmed or otherwise configured to receive content requests from a user via the touch sensitive device and to respond to those requests by providing the user with requested or otherwise recommended content. Is some such embodiments, the server is configured to remotely provision an archive/restore UI feature as provided herein to the touch sensitive device (e.g., via JavaScript or other browser based technology). In other embodiments, portions of the methodology are executed on the server and other portions of the methodology are executed on the device. Numerous server-side/client-side execution schemes can be implemented, as will be apparent in light of this disclosure.

Methodologies

Figure 3A:
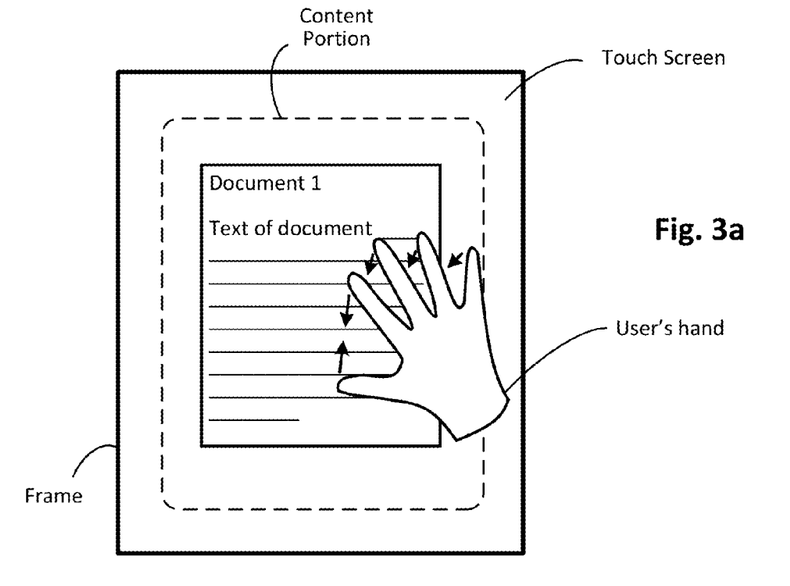
FIG. 3a illustrates an example pinch-based archive function of an electronic touch sensitive device, in accordance with an embodiment of the present invention.

FIG. 3a illustrates an example archive function of an electronic touch sensitive device, in accordance with an embodiment of the present invention. As can be seen, the touch screen generally includes a content portion (within the dashed line area) within the touch screen. A physical frame or support structure is provided about the screen. As can be further seen in the example shown in FIG. 3a, document 1 is currently displayed on the screen. In this particular example, the pinch gesture is associated with five contact points (e.g., hard-coded or via a configuration sub-menu) and the user performs the gesture by contracting all five fingers on the touch sensitive screen. In some embodiments, upon completion of the pinch-gesture (e.g., when all touch points are effectively bunched together or otherwise fully contracted), an action may be automatically performed on document 1, such as one of the example action options indicated in FIG. 1d. For instance, document 1 may be sent to trash, sent to a designated folder, or saved and closed. As previously explained, the resulting action may be user-configurable or hard-coded.

Figure 3B:
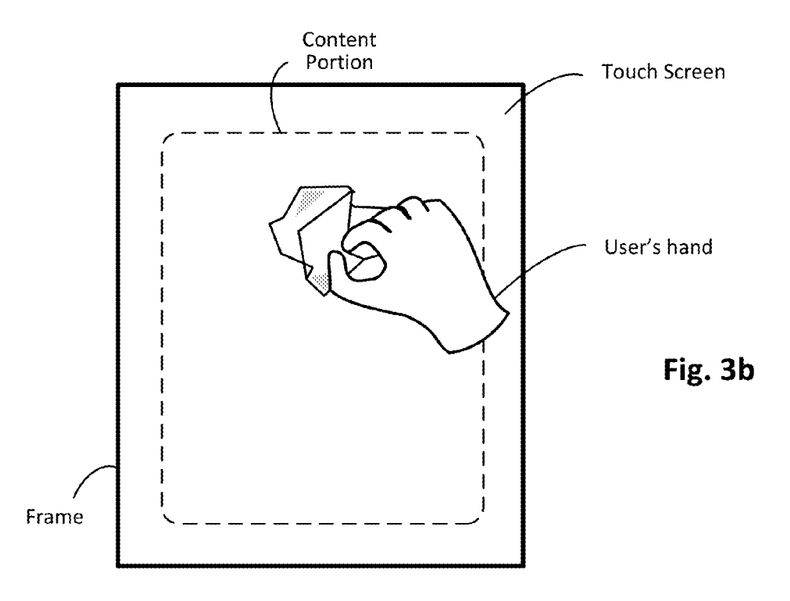
FIGS. 3b-c illustrate an example pinch-based grab and drag function of an electronic touch sensitive device, in accordance with an embodiment of the present invention.
Figure 3C:
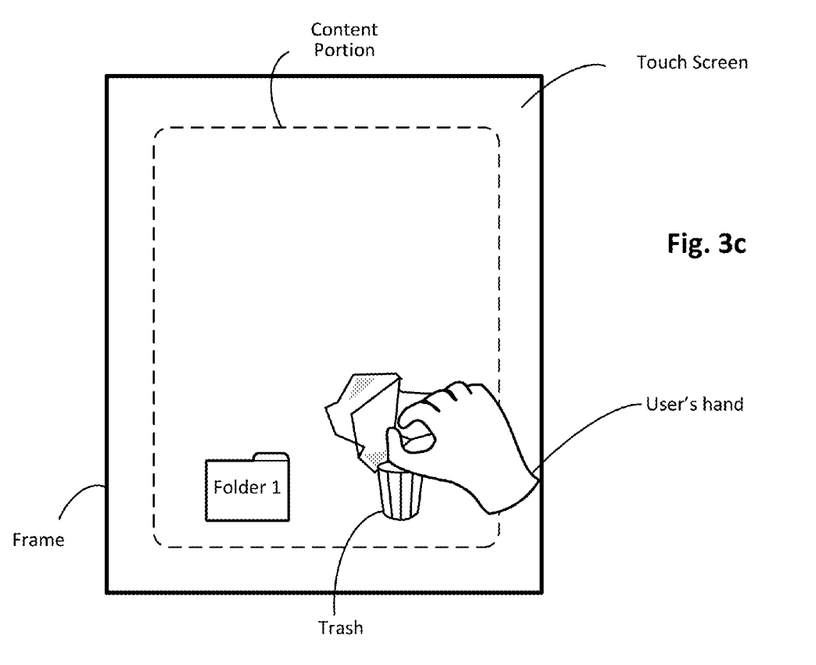

In the example shown in FIG. 3b, a Grab & Drag function has been enabled in the configuration sub-menu, so the inward pinch gesture grabs document 1 (shown as a crumpled piece of paper in this particular example) and the user may then drag the document to a desired destination. In one embodiment, the user decides not to close or archive document 1 and may release the hand from contact with the screen to restore the document to the view shown in FIG. 3a. In another example case, the user may drag and drop the document to the trash bin, as shown in FIG. 3c. In another example embodiment, the user may drag the document to folder 1 (also shown in FIG. 3c), or any other desired location. The drag and drop function may also be configured to save any current progress or work on a document being relocated. In one embodiment, a document may be grabbed with a five-point pinch performed by one of the user's hands, and the document may be dragged to a desired location by sweeping the five fingers to that location. However, it may be difficult to drop a document in a small location with five contact points. Thus, in another example embodiment, the document may be grabbed with a multi-touch pinch and may be dragged by sweeping only one of the contact points to the desired location. For instance, in one such example scenario the user may grab the document with all five fingers of one hand, and then release all fingers but the index finger and drag the document to the trash bin or folder or other desired target destination by dragging the index finger to that location.

Figure 4A:
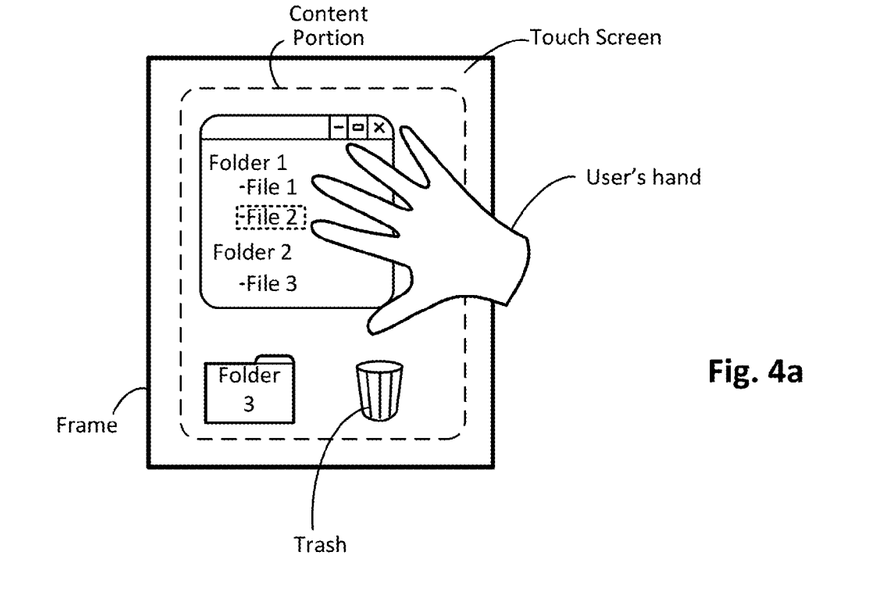
FIGS. 4a-b illustrate an example pinch-based archive function of an electronic touch sensitive device, in accordance with an embodiment of the present invention
Figure 4B:
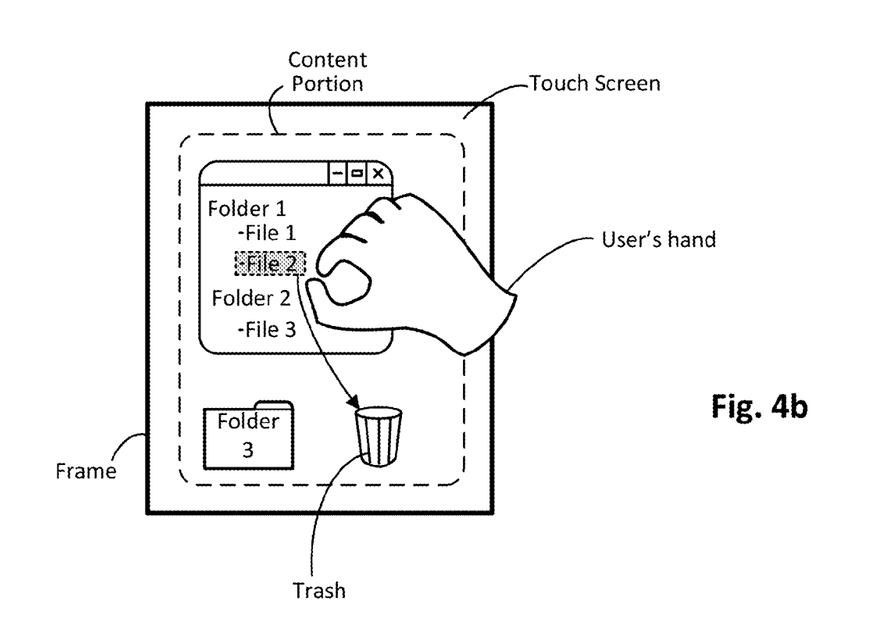

FIGS. 4a-b illustrate an archive function including the tap-pinch feature, in accordance with an embodiment of the present invention. As can be seen, a file browser is displayed including Folder 1, Folder 2, and Files 1-3. In this example case, the 'Tap-Pinch' function previously described with reference to FIG. 1d has been enabled, as well as the 'Send to trash' option. Additionally, in this particular example embodiment, the user has associated the archive/restore feature with a 5-contact pinch gesture. All of these options may be selected in the configuration sub-menu described above, or may be hard-coded. In this particular example, the user taps File 2 with the index finger and then performs the inward pinch gesture with all five fingers of the hand. In order to be detected as a tap-pinch gesture, the multi-touch pinch can be performed within a certain time period (e.g., 1-2 seconds) after the initial tap, in some embodiments. In this example, File 2 is automatically sent to the trash bin, as shown in FIG. 4*b*, when the pinch gesture is completed. Alternatively, the archive function could be configured to automatically send the selected file to Folder 3, or any other pre-established location.

Figure 5A:
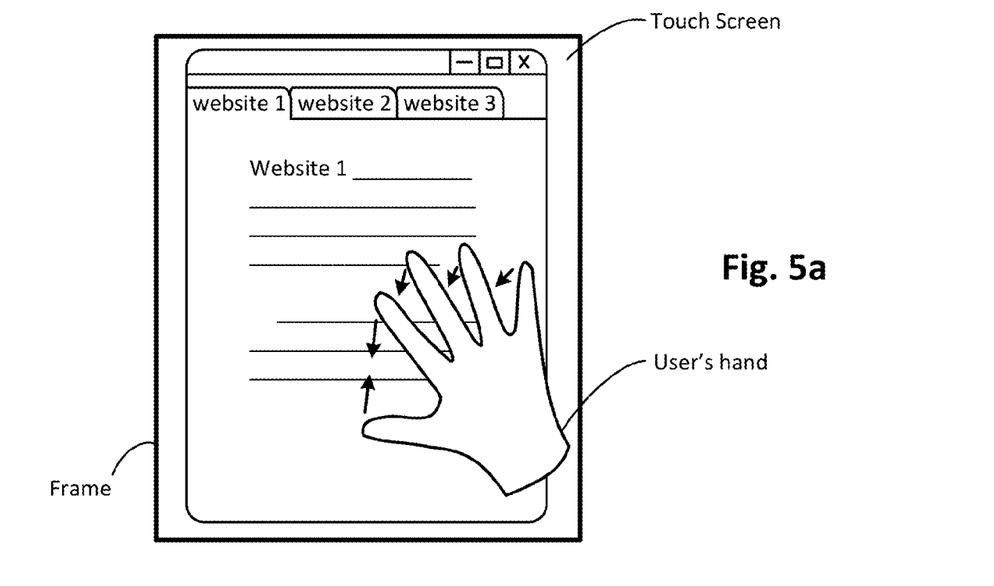
FIGS. 5a-b illustrate an example user interface for a pinch-based close tab (delete) function of an electronic touch sensitive device, in accordance with an embodiment of the present invention.
Figure 5B:
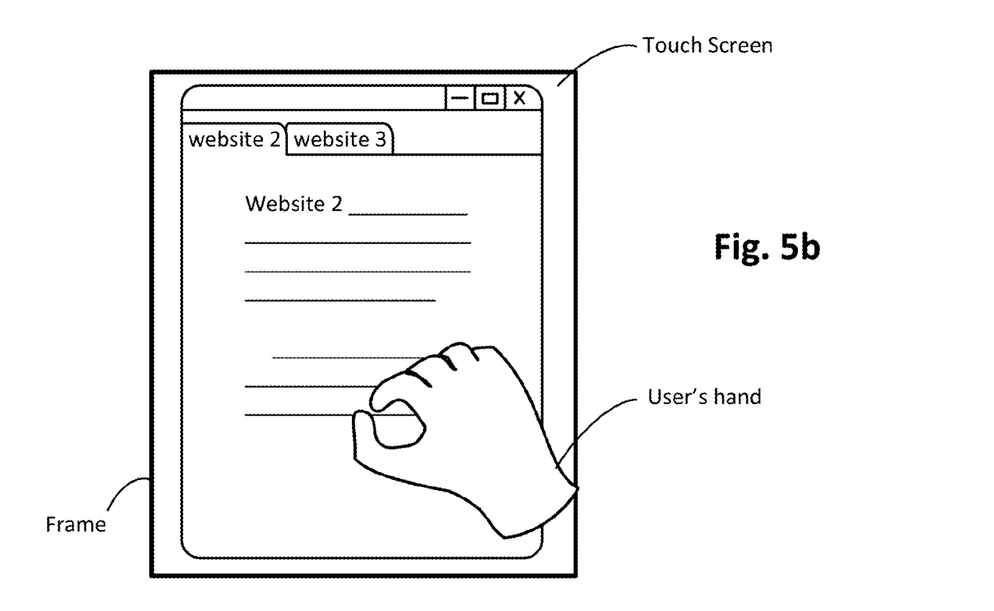

FIGS. 5*a-b* illustrate another example archive function, configured in accordance with one embodiment of the present invention. As can be seen, the content portion is displaying a web browser having a number of website tabs open, the tabs including websites 1-3, and website 1 is currently being displayed. In this specific example, the user has associated the archive/restore feature with a 5-contact pinch gesture, and the user performs the inward pinch gesture by contracting all five fingers of the hand together, as shown in FIG. 5*a*. As can be seen in reference to FIG. 5*b*, in this particular example scenario, the multipoint inward pinch gesture closes the current tab and leaves only websites 2 and 3 open after the gesture is completed.

Figure 6A:
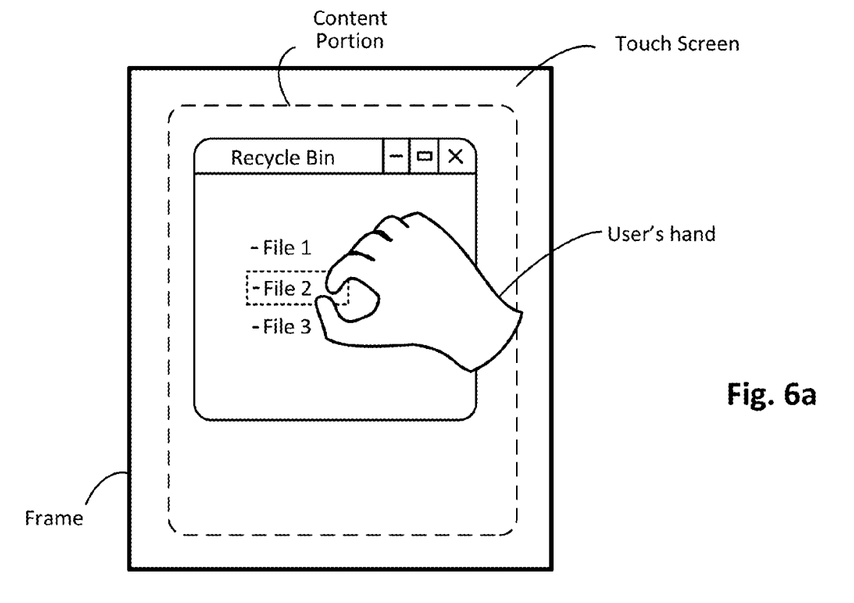
FIGS. 6a-b illustrate an example pinch-based restore function of an electronic touch sensitive device, in accordance with an embodiment of the present invention.
Figure 6B:
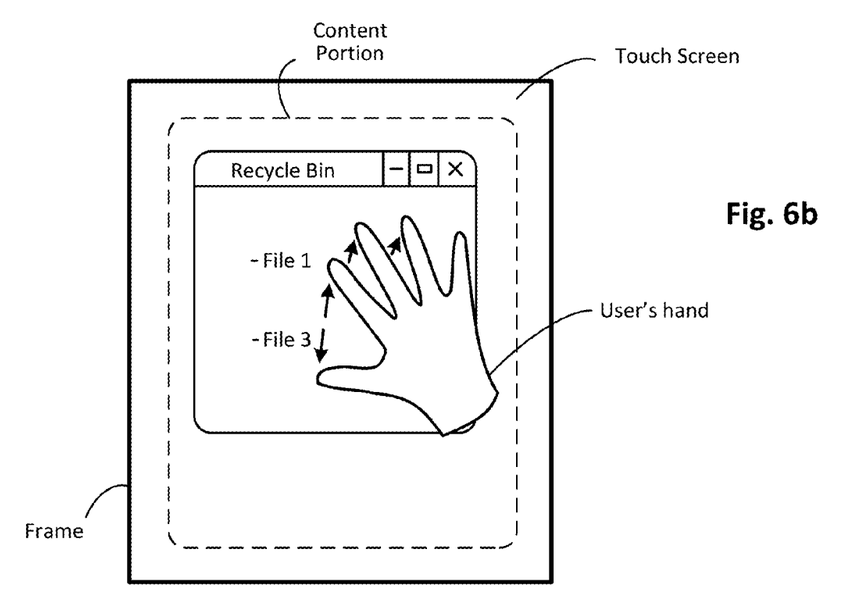

FIGS. 6*a-b* illustrate an example restore function, configured in accordance with one embodiment of the present invention. As can be seen, the user has opened the Recycle Bin folder to view recently or otherwise previously deleted Files 1-3. In the example shown, the Tap-Pinch function previously described with reference to FIG. 1*d* has been enabled, and the archive/restore feature has been associated with a four-touch pinch gesture. As can be seen in FIG. 6*a*, the user in this particular example selects File 2 with an initial tap of the index finger. After selecting File 2 in this example, within a specified time period (e.g., 1-2 seconds) the user performs an outward pinch gesture with four fingers, as shown in FIG. 6*b*. Upon completion of the outward pinch (when figures are sufficiently expanded), File 2 is no longer present in the trash folder because the outward pinch gesture has automatically restored File 2 to its previously saved location in this particular example.

Figure 7A:
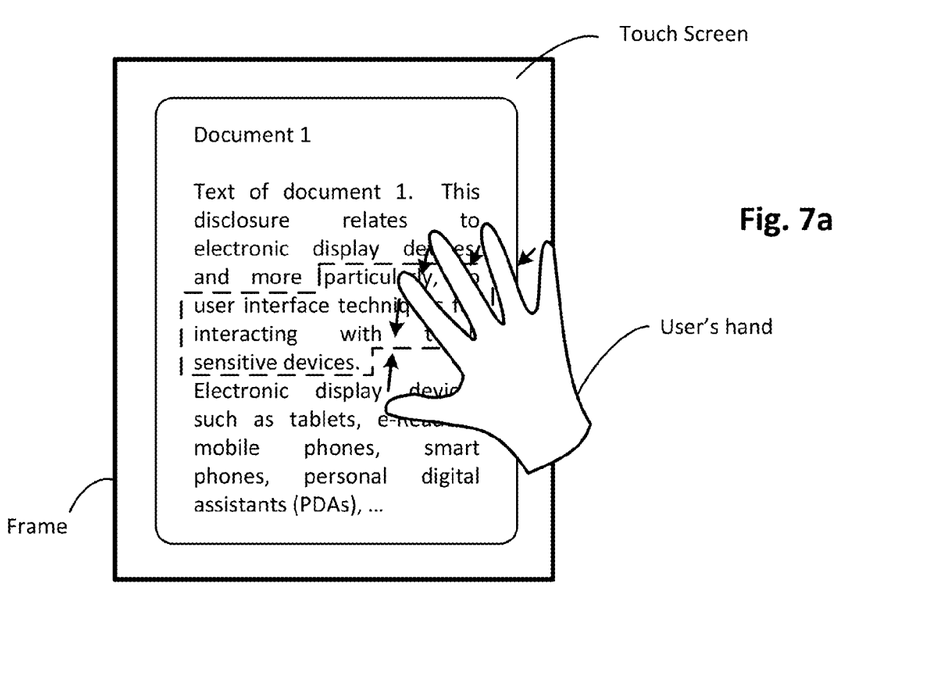
FIGS. 7a-b illustrate a selective pinch-based delete function of an electronic touch sensitive device, in accordance with an embodiment of the present invention.
Figure 7B:
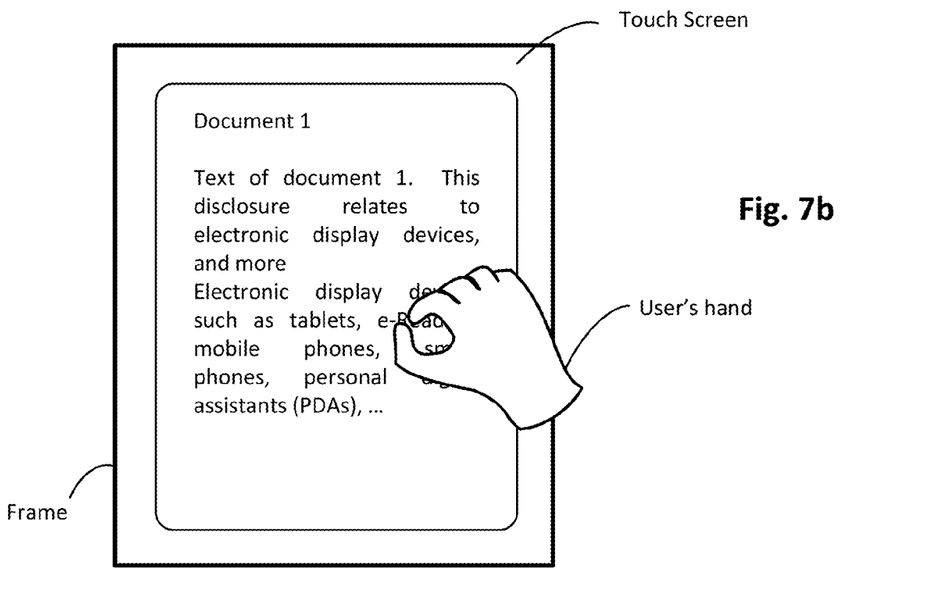

FIGS. 7*a-b* illustrate an example selective delete function, configured in accordance with one embodiment of the present invention. As can be seen, the user has document 1 open and is viewing text contained therein. In the example shown, the 'Delete selected content' option has been enabled, and the archive/restore feature is associated with a five-touch pinch gesture. These options and features may be selected in the configuration sub-menu described in FIG. 1*d*, or may be hard-coded, as will be apparent in light of this disclosure. As can be further seen in FIG. 7*a*, the user in this particular example has selected a section of text within document 1 (shown within the dotted lines), and performs the inward pinch gesture with five fingers over the selected content. As can be further seen in FIG. 7*b*, the inward pinch gesture in this example has caused the selected text to be deleted. The user may undo the delete function using an opposite expanding pinch gesture.

Figure 8:
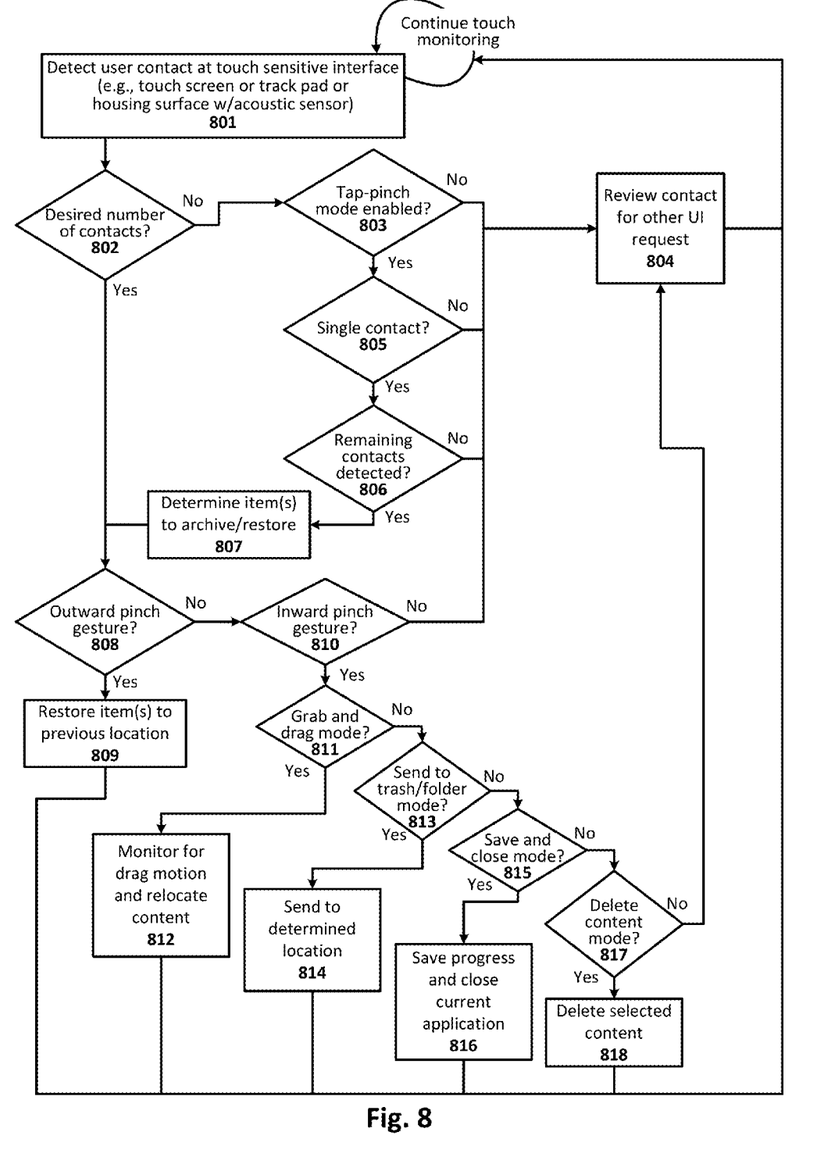
FIG. 8 illustrates a method for archiving and restoring content in an electronic touch sensitive device, in accordance with an embodiment of the present invention.

FIG. 8 illustrates a method for archiving and restoring content in an electronic touch screen device, in accordance with an embodiment of the present invention. This example methodology may be implemented, for instance, by the UI module of the touch sensitive device shown in FIG. 2*a*, or the touch sensitive device shown in FIG. 2*b* (e.g., with the UI provisioned to the client by the server). To this end, the UI module can be implemented in software, hardware, firmware, or any combination thereof, as will be appreciated in light of this disclosure.

In general, any touch sensitive device may be used to detect contact with it by two or more fingers and/or styluses. As soon as the user begins to drag or otherwise move the contact points, the UI code (and/or hardware) can assume a drag gesture has been engaged and track the path of each contact point with respect to any fixed point within the touch surface until the user stops engaging the touch sensitive surface. The release point can also be captured by the UI as it may be used to commit the action started when the user pressed on the touch sensitive surface. In a similar fashion, if the user releases hold without moving the contact point, a press or press-and-hold command may be assumed depending on the amount of time the user was continually pressing on the touch sensitive surface. These main detections can be used in various ways to implement UI functionality.

In this example case, the method includes detecting 801 user contact at the touch sensitive interface. In general, the touch monitoring is effectively continuous. The method continues with determining 802 if the desired number of contacts is detected. The number of contact points associated with the pinch gesture of the archive/restore function may be preset in a configuration sub-menu or hard-coded as previously explained. If the desired number of contacts is detected 802 initially, the method may continue with determining 808 if an outward pinch gesture is detected.

If, however, the desired number of contacts is not detected, the method may continue with determining 803 if the Tap-Pinch mode is enabled. If this mode is not enabled, the contact may be reviewed 804 for other UI requests. If the Tap-Pinch mode is enabled, the method may continue with determining 805 if a single contact (per content item) is detected. If no single contact is detected, the contact may be reviewed 804 for other UI requests. If a single contact is detected, the method may continue monitoring 806 for the remaining contacts associated with a tap-pinch gesture. The number of remaining contacts in this example is equal to the number of contact points associated with the pinch gesture, minus one. Other configurations will be apparent. If the remaining contacts are not detected 806 within a determined period of time (e.g., 1-2 seconds), the contact may be reviewed 804 for other UI requests. If the remaining contacts are detected, the method may continue with determining 807 the item or items selected by the initial tap (or taps). These item or items are those which will be archived or restored or otherwise acted upon completion of the pinch gesture. After determining 807 the item or items to be acted upon, the method may then continue with determining 808 if an expand gesture (outward pinch) is detected.

If an outward pinch gesture is detected 808, the gesture may be associated with the restore function, and the method may continue with restoring 809 the item or items to their previously saved locations. If no outward pinch gesture is detected at 808, the method may continue with determining 810 if an inward pinch gesture is detected. If the inward pinch gesture is not detected, then the contacts may be reviewed 804 for other UI requests, in this example case.

If, however, an inward pinch gesture is detected, the method may continue with determining 811 if the grab and drag mode is selected. If the grab and drag mode is selected, the method may continue with monitoring 812 for a drag motion and relocating the selected content or document to the desired location. If the grab and drag mode is not selected, the method may continue with determining 813 if the send to trash or folder mode is selected. If the send to trash/folder mode is selected, the method may continue with sending 814 the selected content to the determined location (either the trash bin or a selected folder). In one example, the location where a file is archived may be configured in a configuration sub-menu, as described in reference to FIG. 1d.

If the send to trash/folder mode is not selected, the method may continue with determining 815 if the save and close mode is selected. If this mode is selected, the method may continue with saving 816 changes made to content and closing the current application. The application closed may be a text document, slideshow, spreadsheet, webpage, just to name a few examples.

If the save and close mode is not selected, the method may continue with determining 817 if the delete content mode is enabled. If this mode is enabled, the method may continue with deleting 818 the currently selected content. In one such example, the selected content may be a section of text, a number of cells in a spreadsheet, or any other content selected by the user. If the delete content mode is not selected, then the contacts may be reviewed 804 for other UI requests. As can be further seen, the method includes continuously monitoring the touch sensitive surface for contact and movement.

Numerous variations and configurations will be apparent in light of this disclosure. For example, one example embodiment provides a device that includes a display for displaying content to a user, and a touch sensitive surface for allowing user input. The device further includes a user interface including an archive/restore mode that can be activated in response to a user contact via the touch sensitive surface, wherein the archive/restore mode is configured to archive or restore content currently shown on the display, and the user contact includes a multipoint pinch gesture. In some cases, the display is a touch screen display that includes the touch sensitive surface. In some cases, the touch sensitive surface is a track pad. In some cases, the archive/restore mode is configured to archive content in response to an inward multipoint pinch gesture. In some cases, archiving content includes deleting content (reversibly or permanently). In some cases, the archive/restore mode is configured to restore content in response to an outward multipoint pinch gesture. In some cases, the user contact includes a selection of one or more items (one or more initial taps on each piece of target content), followed by an inward or outward pinch gesture that operates on those one or more items. Note the one or more items do not need to be contiguous. In some cases, the archive/restore mode is configured to delete a user-selected portion of a document, or close a browser tab, in response to an inward multipoint pinch gesture. In some cases, the archive/restore mode is configured to archive content currently shown on the display by deleting a currently displayed file or folder in response to the multipoint pinch gesture. In some cases, the archive/restore mode is configured to archive content currently shown on the display by saving and closing a currently running application in response to the multipoint pinch gesture. In some cases, the archive/restore mode is configured to archive content currently shown on the display by saving a currently running file to a selected location in response to the multipoint pinch gesture. In some cases, the archive/restore mode is configured to archive content currently shown on the display by moving the content to a desired location in response to an inward multipoint pinch and dragging gesture. In some cases, the archive/restore mode is configured to restore content currently shown on the display by saving one or more items to a previous save location, or to restore a previous content view, in response to the multipoint pinch gesture.

Another example embodiment of the present invention provides a device that includes a display having a touch screen interface and for displaying content to a user, and a user interface including an archive/restore mode configured to archive or restore content in response to a multipoint pinch gesture via received from the user via the touch screen interface. In some such cases, the multipoint pinch gesture can operate on one or more items user-selected. In some cases, the device is an eReader device or a tablet computer or a smartphone, or other such mobile devices. In some cases, the archive/restore mode is configured to restore content by automatically saving one or more items to a previous save location, or to restore a previous content view, in response to the multipoint pinch gesture. In some cases, the archive/restore mode is configured to archive content by automatically performing at least one of the following in response to the multipoint pinch gesture: deleting a user-selected portion of a document, permanently deleting a file, reversibly deleting a file, saving a file to a selected location, and saving one or more items to a previous save location.

Another example embodiment of the present invention provides a computer readable medium encoded with instructions that when executed by one or more processors, cause a process to be carried out. The process includes, in response to a multipoint pinch gesture via a touch sensitive interface, archiving or restoring content associated with the gesture. In some such cases, the process is configured to automatically perform at least one of the following in response to the multipoint pinch gesture: deleting a user-selected portion of a document, permanently deleting a file, reversibly deleting a file, saving a file to a pre-established location, closing an application, closing a browser tab, and saving one or more items to a previous save location.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A device, comprising:
   a display for displaying content to a user;
   a touch sensitive surface for allowing user input; and
   a user interface including an archive/restore mode that can be activated in response to user contact via the touch sensitive surface, the user contact including a selection of content followed by a multipoint pinch gesture, wherein the archive/restore mode is configured to archive the selected content in response to an inward multipoint pinch gesture and restore archived content in response to an outward multipoint pinch gesture.

2. The device of claim 1 wherein the display is a touch screen display that includes the touch sensitive surface.

3. The device of claim 1 wherein the touch sensitive surface is a track pad.

4. The device of claim 1 wherein the multipoint pinch gesture includes three to five simultaneous touch points.

5. The device of claim 1 wherein archiving content includes deleting content.

6. The device of claim 1 wherein the archive/restore mode is user-configurable.

7. The device of claim 1 wherein the selection is carried out by a tap gesture distinct from the multipoint pinch gesture, and the multipoint pinch gesture includes three to five simultaneous touch points, such that the combination of the tap gesture and the multipoint pinch gesture uniquely conveys that archival of the selection is desired.

8. The device of claim 1 wherein the selection is a user-selected portion of a document such that only part of the displayed document is selected.

9. The device of claim 1 wherein the archive/restore mode is configured to archive content currently shown on the display by reversibly deleting the selection in response to the inward multipoint pinch gesture.

10. The device of claim 1 wherein the archive/restore mode is further configured to save and close a currently running application in response to the inward multipoint pinch gesture.

11. The device of claim 1 wherein the archive/restore mode is further configured to save a currently running file to a selected location in response to the inward multipoint pinch gesture.

12. The device of claim 1 wherein the archive/restore mode is configured to archive content currently shown on the display by moving the selection to a desired location in response to an inward multipoint pinch and dragging gesture.

13. The device of claim 1 wherein the multipoint pinch gesture is not provided over the selection.

14. A device, comprising:
   a display having a touch screen interface and for displaying content to a user; and
   a user interface including an archive/restore mode configured to archive content in response to a selection of one or more currently displayed content items followed by an inward multipoint pinch gesture received via the touch screen interface, the mode further configured to restore archived content in response to an outward multipoint pinch gesture received via the touch screen interface.

15. The device of claim 14 wherein the multipoint pinch gesture is not provided over the selection.

16. The device of claim 14 wherein the device is an eReader device or a tablet computer or a smartphone.

17. The device of claim 14 wherein the inward multipoint pinch gesture includes three to five simultaneous touch points.

18. The device of claim 14 wherein the selection is a user-selected portion of a document such that only part of the displayed document is selected.

19. A non-transitory computer readable medium encoded with instructions that when executed by one or more processors, cause a process to be carried out, the process comprising:
   receiving a selection of one or more currently displayed content items;
   in response to a subsequent inward multipoint pinch gesture via a touch sensitive interface, archiving content associated with the selection; and
   in response to an outward multipoint pinch gesture via the touch sensitive interface, restoring archived content.

20. The computer readable medium of claim 19 wherein the process is configured to automatically perform at least one of the following in response to the inward multipoint pinch gesture: deleting a user-selected portion of a document, permanently deleting a file, reversibly deleting a file, saving a file to a pre-established location, closing an application, closing a browser tab, and saving one or more items to a previous save location.

* * * * *